Oct. 24, 1950  A. T. McCARY  2,526,679
TEMPERATURE INDICATOR SWITCH
Filed March 19, 1947  2 Sheets-Sheet 1
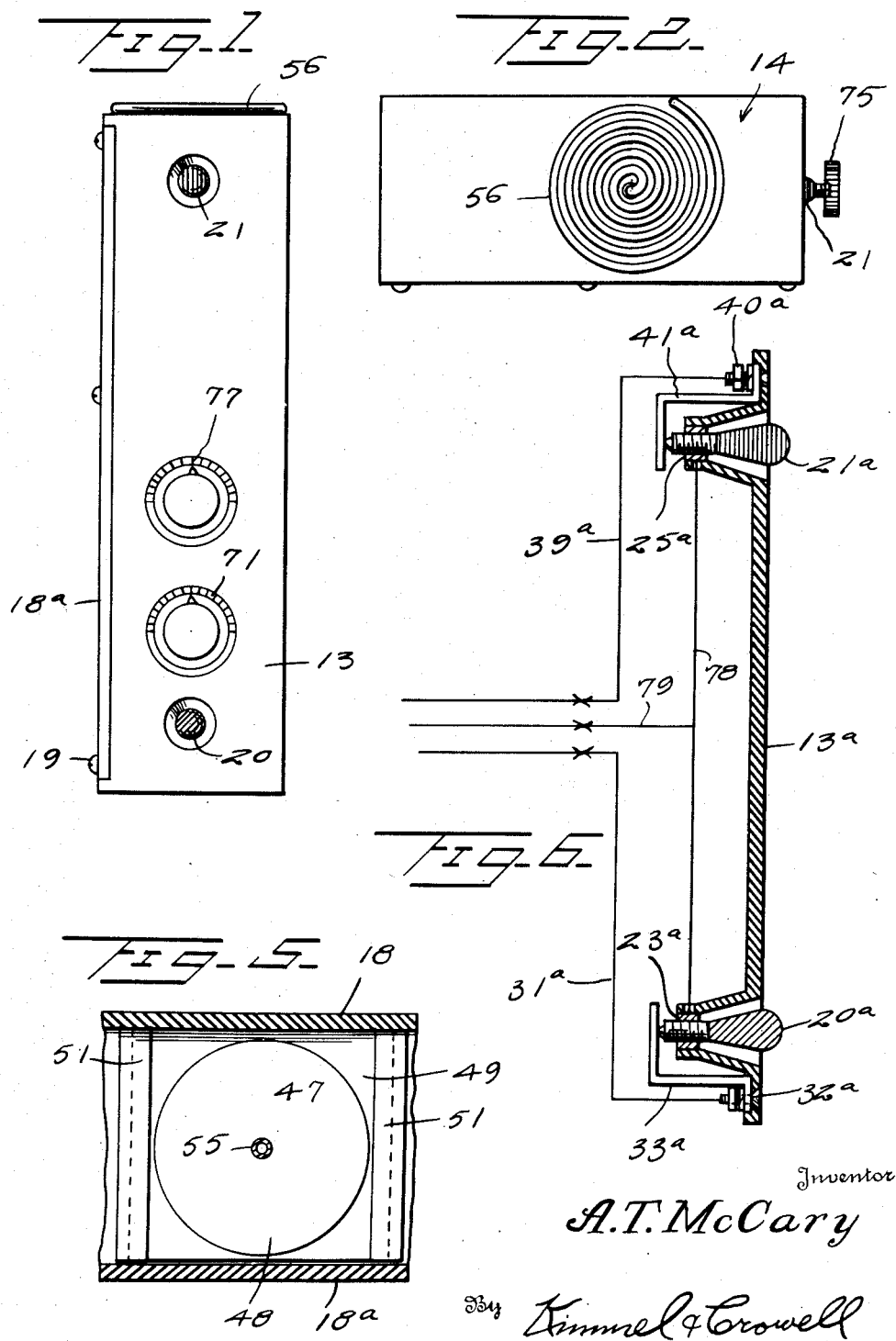

Oct. 24, 1950 A. T. McCARY 2,526,679
TEMPERATURE INDICATOR SWITCH
Filed March 19, 1947 2 Sheets-Sheet 2
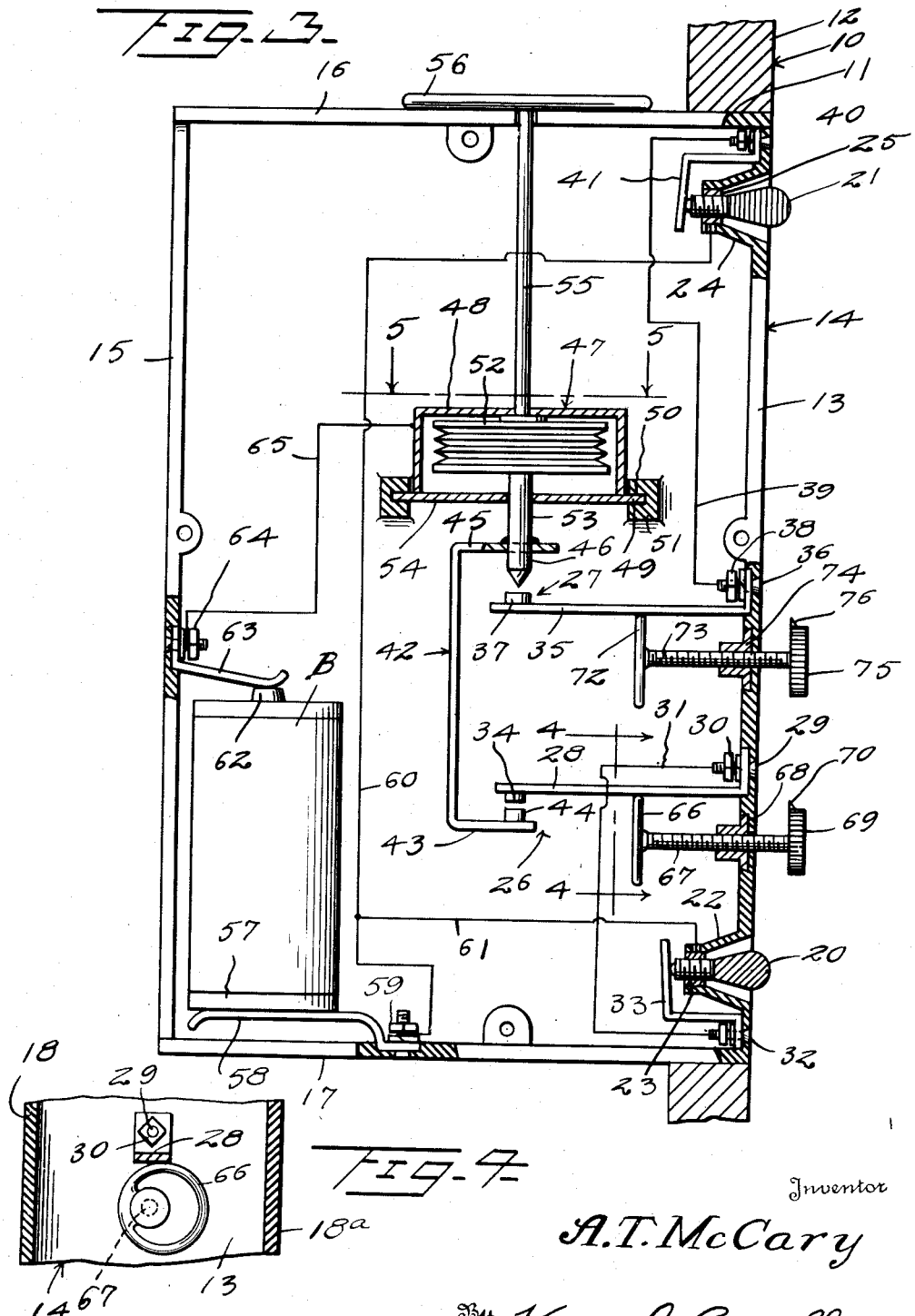

Patented Oct. 24, 1950

2,526,679

UNITED STATES PATENT OFFICE 2,526,679

TEMPERATURE INDICATOR SWITCH

Alva Tyree McCary, El Paso, Tex.

Application March 19, 1947, Serial No. 735,706

1 Claim. (Cl. 200—140)

This invention relates to a predetermined high or low temperature indicating means.

An object of this invention is to provide a temperature indicating means for mounting within a refrigerator or other place of use so that the user will be able to determine at a glance whether the temperature of the air within the location of use is being maintained within a predetermined temperature range.

Another object of this invention is to provide, in combination with a refrigerator, a temperature indicating means which will indicate maintenance of minimum and maximum temperatures within the refrigerator.

A further object of this invention is to provide a device of this kind which can be manually adjusted so that the signal elements may be brought into operation at any desired minimum and maximum temperature ranges.

A further object of this invention is to provide a device of this kind which is simple in construction and can be manufactured as a relatively small unit for mounting within the location of use, which has correlated therewith a pair of signal elements which, in one instance, may be remote from the refrigerator or other location of use, so that the user of the device will have a visible or audible indication as to whether the temperature of the air within the place of use is at a dangerously high or low temperature.

As referred to herein, it will be understood that the term "refrigerator" is intended to comprehend any and all other suitable locations of use, as for example, a sickroom, etc.

With the above and other objects in view, my invention consists in the arrangement, combination and details of construction disclosed in the drawings and specification, and then more particularly pointed out in the appended claims.

In the drawings,

Figure 1 is a detail front elevation of a temperature indicating device constructed according to an embodiment of this invention, Figure 2 is a plan view of the device, Figure 3 is a vertical section through the device, showing the device in mounted position within the refrigerator, Figure 4 is a fragmentary sectional view taken on the line 4—4 of Figure 3, Figure 5 is a fragmentary sectional view taken on the line 5—5 of Figure 3, Figure 6 is a fragmentary sectional view of a modified form of this invention.

Referring to the drawings, the numeral 10 designates generally a refrigerator of conventional construction. The refrigerator 10 is formed with an opening 11 in one wall 12 thereof, within which a temperature indicating device constructed according to an embodiment of this invention, and generally indicated as 14, is adapted to be mounted.

The temperature indicating device 14 comprises a housing, having an outer wall 13, an inner wall 15, upper and lower walls 16 and 17, and opposite side walls 18. One of the side walls, designated 18a is removable, being secured by fastening members 19. The housing 14 has mounted therein a pair of signal elements which, in the present instance are visible elements, indicated as light bulbs 20 and 21.

The front wall 13 is formed with an inwardly recessed portion 22, having a light socket 23 for receiving the base of the light bulb 20. The front wall 13, at its upper portion, is formed with a second inwardly recessed or offset portion 24, having a light socket 25 for receiving the base of the light bulb 21.

A pair of switches, generally designated as 26 and 27, are disposed within the housing 14 and are connected in circuit with the signal elements 20 and 21. The switch 26 includes an elongated resilient arm or bar 28 which is fixed, as at 29, to the inner side of the front wall 13. The fastening member 29 also includes a terminal 30 which is connected by means of a conductor 31 to a terminal 32 associated with the light bulb 20. The terminal 32 has connected thereto an L-shaped center contact engaging member 33 for engaging the center contact of the lower light bulb 20. The switch 26 also includes a contact 34 on the lower side of the resilient contact bar 28.

The switch 27 includes an elongated contact bar 35, secured as at 36, to the inner side of the front wall 13, and the bar 35 has a contact 37 on the upper side thereof. A terminal 38 is connected with the outer or forward end of the bar 35 and is connected by means of a conductor 39 to a terminal 40 associated with the upper signal member or light bulb 21. An L-shaped contact member 41 is connected with the terminal 40 and engages the center contact of the light bulb 21.

A contact carrier 42 of U-shaped construction has a lower leg 43 disposed below the contact 34, and the leg 43 has a contact 44 confronting the contact 34. The carrier 42 also includes an upper leg 45, having a contact 46 confronting the contact 37 of the upper bar 35. The two contacts 44 and 46 are adapted during normal operation of the refrigerator, when the temperature within the refrigerator is within a predetermined range, to be disposed out of engagement with the contacts 34 and 37 so that the light bulb or signal elements 20 and 21 will not be energized.

The carrier 42 is adapted to be vertically moved, according to the variations in the temperature within the refrigerator, by means of a thermostatic member, generally designated as 47. The thermostatic member 47 includes a housing 48, formed with a pair of flanges 49 engaging in grooves 50 formed in transversely extending supporting bars 51 which are fixed to the side wall 18 of the housing. The thermostat housing 48 has mounted therein a bellows type member 52 which has extending downwardly therefrom a stem 53 which slidably engages through the lower wall 54 of the housing 48. The contact 46 is fixed to the lower end of the stem or shank 53. The bellows 52 has connected with the upper side thereof an elongated tube 55 which extends upwardly through the top wall 16, and the tube 55 terminates above the top wall 16 in a spiral coil 56. The tube 55 and the coil 56 are adapted to be filled with expansible and contractible gas which will also fill the bellows 52. Upon expansion of the gas in the tube 55 and the coil 56, and in the bellows 52, the shank 53 to which the carrier 42 is fixed securely will move downwardly so that the upper contact 46 will engage contact 37 of switch 27 and thereby close the electric circuit to the signal element or upper light bulb 21.

When the temperature drops below a predetermined degree, the contraction of the gas in the tube 55, the coil 56, and the bellows 52 will cause shank 53 to move upwardly, carrying therewith contact carrier 42 so that lower contact 44 will engage contact 34. At this time an electric circuit will be closed to the lower signal element or light bulb 20.

In the present instance a battery B is used as a source of electric current supply, and is mounted within the housing 14. The battery B has a lower contact 57 engaged with a resilient contact 58 connected to a terminal 59. The terminal 59 is connected by means of a conductor 60 to the socket 25, and is also connected by means of a conductor 61 to the socket 23. The center terminal 62 of the battery B has a resilient contact 63 engaged therewith, which is connected to a terminal 64. The terminal 64 is connected by means of a conductor 65 to the thermostat housing 18 which forms, with the contacts 44 and 46 and the carrier 42, one common side for the two switches 26 and 27.

In order to provide a means whereby the closing of the switches 26 and 27 may be adjusted, I have provided a cam-shaped adjusting member 66 which is secured to a screw shaft 67. The shaft 67 is threaded through a nut 68, carried by the front wall 13, and a knob 69 is fixed to the outer end of the screw shaft 67 and is formed with a pointer 70 swingable across a graduated dial or scale 71 carried by the front wall 13.

The upper switch 27 may be adjusted by means of a cam adjusting member 72 which is fixed to a screw shaft 73, threaded through a nut 74 carried by the front wall 13. A knob 75 is fixed to the outer end of the screw shaft 73 and is provided with a pointer 76 swingable over a dial or scale 77 on the front wall 13.

Referring now to Figure 6, there is disclosed a slightly modified form of this invention. As disclosed in Figure 6, the signal elements may be positioned remote from the refrigerator. The signal elements 20a and 21a are mounted on a panel 13a, at a point remote from the refrigerator. The sockets 23a and 25a of the signal elements are connected together by a common conductor 78. The center contact of the signal member 20a has engaged therewith an L-shaped contact member 33a which is connected to a terminal 32a, and the latter is connected by means of a conductor 31a to the adjustable contact bar 28.

The center contact of the signal member 21a has engaged therewith an L-shaped contact member 41a which is connected to a terminal 40a, and the latter is connected by means of a conductor 39a to the contact bar 35. The common conductor 78 is connected by means of a conductor 79 to the conductor 60 which is shown in Figure 3. In other respects the details of construction shown in Figure 3 will be the same for the structure shown in Figure 6.

In the use and operation of this invention, one wall of the refrigerator 10 is formed with an opening 11, within which the housing 14 is mounted, so that the temperature of the air within the refrigerator will contact with the thermostat 47. When the gas in the thermostat expands under rise of temperature in the refrigerator, the carrier 42 will be lowered so that contact 46 will engage contact 37 and close the circuit to the signal member 21. This signal member may be constructed in the form of a red light bulb.

The user of this device will thereupon be able to determine from a glance at the signal members, the approximate temperature of the air within the refrigerator, and can regulate the operation of the refrigerator accordingly.

Where the temperature of the refrigerator is normal, carrier 42 will be disposed in a neutral position with the contacts of the carrier spaced from contacts 34 and 37 so that the signal members 21 and 20 will not be energized. In the event the temperature of the air in the refrigerator should drop below a predetermined degree, the bellows 52 will contract, thereby raising the carrier 42 and causing contact 44 to engage contact 34. Switch 26 will then be closed and the circuit will be closed to the green light signal bulb 20. When signal 20 is energized, the user will know that while the temperature within the refrigerator is less than the desired temperature, the temperature will not be such as to cause a spoilage of the food in the refrigerator. Through the adjustment of the cam members 66 and 72, the closing of the switches 26 and 27 may be varied so as to provide for operation of the signal elements within a predetermined minimum and maximum range.

I do not mean to confine myself to the exact details of construction herein disclosed, but claim all variations falling within the purview of the appended claim.

What I claim is:

Temperature responsive switch means comprising a housing, a pair of switches in said housing each adapted to energize an electrical circuit, said pair of switches including a U-shaped contact carrier confronting contacts carried by the parallel legs of said carrier, a pair of elongated resilient bars fixed at one end thereof relative to said housing and extending between said legs of said carrier, contacts carried by said bars confronting the contacts on said legs, a temperature responsive element carried by said housing, a thermostatic operator operatively connected to said element and including a movable member connected to said carrier for moving the latter upon variation of the temperature to effect engagement of one of the contacts on said carrier with the contact on one of said resilient bars when the temperature rises or falls a predetermined degree, and a rotatable cam member carried by said housing and engaging each of said bars for adjusting the latter whereby said contacts will engage at selected predetermined temperatures for energizing the related electrical circuit.

ALVA TYREE McCARY.

REFERENCES CITED

The following references are of record in the file of this patent:

UNITED STATES PATENTS

| Number | Name | Date |
| --- | --- | --- |
| 934,754 | Porter | Sept. 21, 1909 |
| 1,478,084 | Whittington | Dec. 18, 1923 |
| 2,043,360 | Townsend | June 9, 1936 |
| 2,092,085 | Riley | Sept. 7, 1937 |
| 2,115,027 | Leonard | Apr. 26, 1938 |